F. PAMPE.
PROCESS OF COOKING MAIZE OR OTHER CEREALS.
APPLICATION FILED NOV. 30, 1907.
999,852.
Patented Aug. 8, 1911.
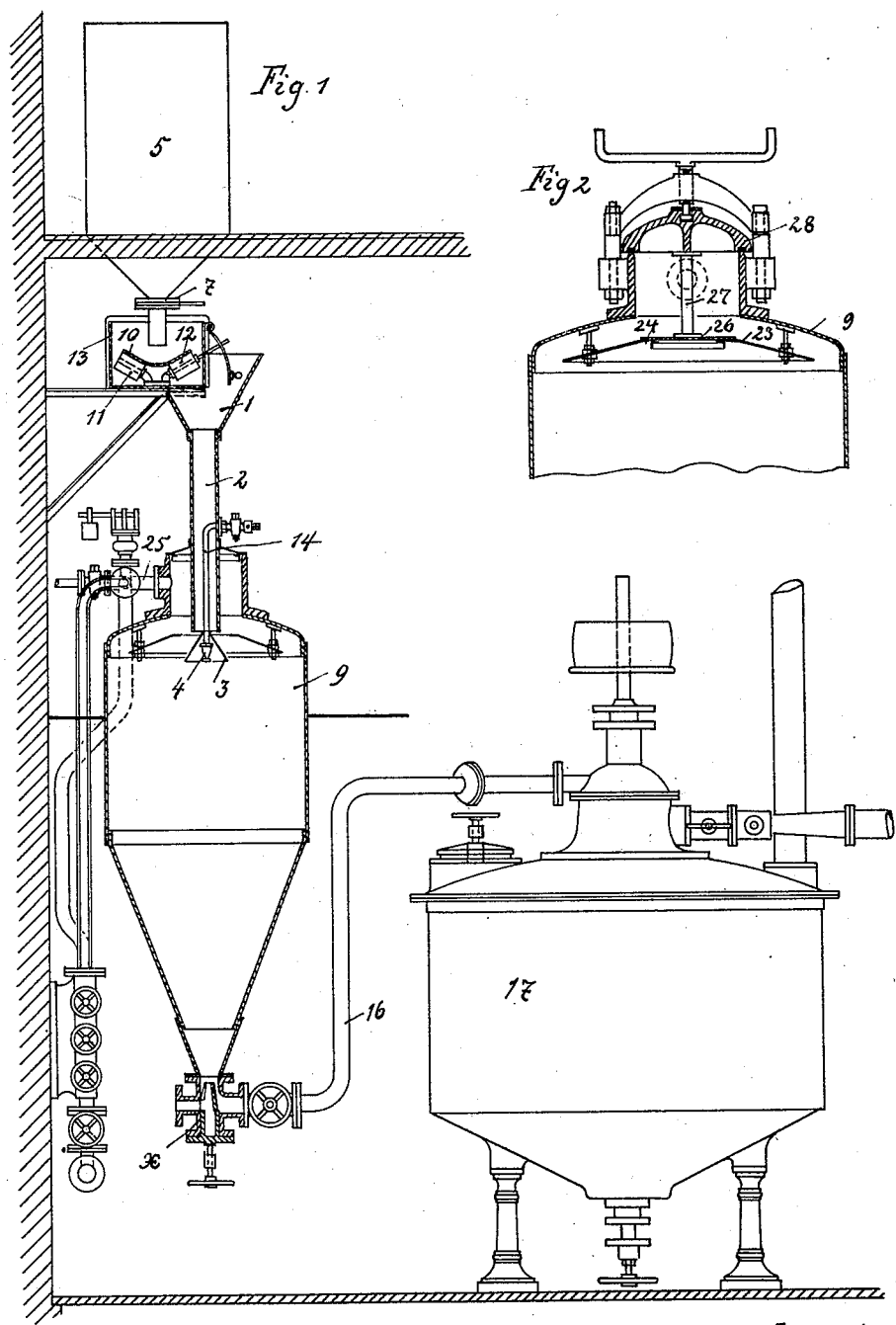
Witnesses.
Inventor.

UNITED STATES PATENT OFFICE.

FRANZ PAMPE, OF HALLE-ON-THE-SAALE, GERMANY.

PROCESS OF COOKING MAIZE OR OTHER CEREALS.

999,852. Specification of Letters Patent. Patented Aug. 8, 1911.

Application filed November 30, 1907. Serial No. 405,113.

*To all whom it may concern:*

Be it known that I, FRANZ PAMPE, a subject of the German Emperor, residing at Halle-on-the-Saale, Kingdom of Prussia, Germany, have invented certain new and useful Improvements in Processes of Cooking Maize or other Cereals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the preparation of starch containing materials such as maize and cereals for mashing and saccharifying processes in the manufacture of alcohol. These materials are usually treated whole, rolled or only coarsely comminuted and are customarily cooked with steam under pressure of from two to four atmospheres. In these processes the results are that the starch is to a certain extent caramelized and the nitrogenous products of the raw material are altered and become sticky or viscous. In the treatment of finely ground or mashed material the difficulty arises that when the meal is stirred in the liquid, lumps of various sizes are formed and the meal contained within these lumps retards the solution and the saccharification, resulting in a reduction of the amount of alcohol formed.

My process consists in very finely grinding or mashing the grain with the aid of a special manner of mixing with water to prevent the formation of lumps and I decrease the pressure at which the material is cooked from 1 to 1½ atmospheres and only in the case of maize which is a very hard grain is the pressure raised to 2 atmospheres.

Referring to the drawings in which like parts are similarly designated, Figure 1 is an elevation of the cooking plant, partly in vertical section. Fig. 2 is an enlarged sectional view of the upper part of the cooker when closed.

The finely ground material is carried from a roller mill or other suitable device not shown, to a hopper 5 which is of sufficient volume to contain at least the charge for one of the cookers and is controlled by a slide or other suitable valve 7 controlling the discharge onto an endless belt 10 supported by rollers 11, 12 in such manner that the carrier part of the belt forms a trough. The rollers 12 are pivoted to move so that they can be dropped to permit one edge of the belt to lower and discharge its contents into a hopper 1, Fig. 1 of a removable charging device where it discharges through pipe 2 and strikes the distributer bell 3, supported on a water supply pipe 14. The fine particles form a dust cloud and the coarser particles are evenly distributed around the bell and fall in a thin uniform layer over its edges. Within the bell on the end of pipe 14 is an atomizer or spray nozzle 4 in such a position as to cause the water supply thereto to pass substantially transversely through the falling material and become intimately mixed therewith, the water used being at a temperature of about 60° C. The mixture falls free from lumps to the lower part of the cooker 9 which has a conical bottom and is supplied by steam through the nozzle $x$ at the bottom. The material that has been charged will be maintained in circulation within the cooker by a central, upwardly projected jet of steam, thoroughly mixed and cooked, thereby avoiding the use of any complicated stirring mechanism.

After the cooker 9 has been filled the charging device is removed and the manhole is closed by the cover 28, Fig. 2 having a depending rod 27 for holding a cover plate 26 on the opening 24 in the conical deflector 23 secured in the top 29 of the cooker 9. The deflector prevents particles of mash carried up by the steam from being carried over to the next cooker coupled therewith, the steam passing to the next cooker through pipe 25. When the cooking has been completed the steam outlet is closed and the contents of the cooker is forced by steam pressure on its surface through pipe 16 to the saccharifying apparatus 17.

I claim:—

The process of mashing malt, and other grains for the manufacture of alcohol which comprises grinding the grain to fine flour, supplying said flour to the cooker in a fine long stream causing the formation of a cloud of said flour in the upper part of the cooker, passing a spray of water from the center of the cloud outward therethrough as the dust settles in the cooker and collecting the wet flour in a conical body below the point where it is wet and projecting a stream of steam centrally from the lower apex through the mass thereby imparting a uniform circulation thereto.

In testimony that I claim the foregoing as my invention, I have signed my name in presence of two subscribing witnesses.

FRANZ PAMPE.

Witnesses:
WOLDEMAR HAUPT,
HENRY HASPER.

Copies of this patent may be obtained for five cents each, by addressing the "Commissioner of Patents, Washington, D. C."